United States Patent Office 3,660,460
Patented May 2, 1972

3,660,460
PROCESS FOR PREPARING N,N-BIS-CYANO-
ETHYLATED DERIVATIVES OF ALIPHATIC
PRIMARY AMINE BRANCHED AT THE
α-POSITION
Hideaki Munakata, Kazuo Watanabe, Akitada Osako, and Rintaro Urakabe, Shiga-ken, Japan, assignors to Toyo Boseki Kabushiki Kaisha, Toyo Spinning Co., Ltd.
No Drawing. Filed Aug. 6, 1969, Ser. No. 848,082
Claims priority, application Japan, Aug. 19, 1968, 43/59,348
Int. Cl. C07c 121/28, 121/46
U.S. Cl. 260—464            6 Claims

ABSTRACT OF THE DISCLOSURE

Process for preparing the N,N-bis-cyanoethylated derivative of an aliphatic primary amine branched at the α-position which comprises reacting an aliphatic primary amine of the formula:

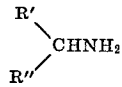

wherein R' and R" are each a lower alkyl group or are linked together to represent a lower alkylene group or its N-monocyanoethylated derivative with acrylonitrile in the presence of an acidic catalyst to give the corresponding N,N-biscyanoethylated compound, which is useful as the starting material in the production of an easily dyeable polyamide fiber.

---

The present invention relates to a process for preparing the N,N-bis-cyanoethylated derivative of an aliphatic primary amine branched at the α-position.

Hitherto, it has been known that an aliphatic primary amine is generally reacted with acrylonitrile in the presence or absence of a basic catalyst to give the mono- and bis-cyanoethylated derivatives as shown in the following formulae:

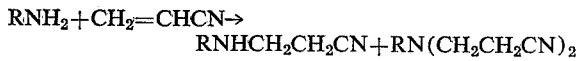

When, however, the aliphatic primary amine is the one branched at the α-position as shown by the formula:

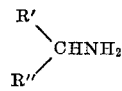

wherein R' and R" are each a lower alkyl group (e.g. methyl, ethyl, propyl, isopropyl, butyl, pentyl) or are linked together to represent a lower alkylene group (e.g. tetramethylene, pentamethylene), the bis-cyanoethylated compound can not be obtained even in the presence of a basic catalyst, while the corresponding mono-cyanoethylated compound may be readily prepared even in the absence of such catalyst.

It has now been unexpectedly found that the bis-cyanoethylation of an aliphatic primary amine branched at the α-position, particularly the conversion of the monocyanoethylated derivative of such amine into the corresponding bis-cyanoethylated compound, can be accomplished by effecting the reaction in the presence of an acidic catalyst. The present invention is based on this finding.

Accordingly, a basic object of the present invention is to embody a process for bis-cyanoethylation of an aliphatic primary amine branched at the α-position with acrylonitrile. Another object of this invention is to embody a process for conversion of the mono-cyanoethylated derivative of an aliphatic primary amine branched at the α-position into the corresponding bis-cyanoethylated derivative. A further object of the invention is to embody the bis-cyanoethylated derivative of an aliphatic primary amine branched at the α-position. These and other objects will be apparent to those conversant with the art to which the present invention pertains from the subsequent description.

According to the present invention, an aliphatic primary amine of the formula:

 [I]

wherein R' and R" are each as defined above or its monocyanoethylated derivative of the formula:

 [II]

wherein R' and R" are each as defined above is reacted with acrylonitrile in the presence of an acidic catalyst to give the bis-cyanoethylated compound of the formula:

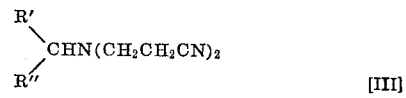 [III]

wherein R' and R" are each as defined above in an excellent yield.

The starting compound is the aliphatic primary amine [I] or its mono-cyanoethylated derivative [II]. The mono-cyanoethylated compound [II] may be the one produced by reacting the aliphatic primary amine [I] with acrylonitrile in the presence or absence of a basic or acidic catalyst.

As the acidic catalyst in the present invention, there should be used a protonic acid, a Lewis acid, an amine salt or an ammonium salt, which are soluble in the reaction system. To be soluble in the reaction system means that an effective amount of the acidic catalyst or the salt produced from the acidic catalyst and the starting amine is dissolved in the reaction system comprising acrylonitrile, the starting amine or its mono-cyanoethylated compound and a solvent occasionally added, at least at the reaction temperature. A substance being insoluble in the reaction system scarcely shows the catalytic effect. For example, sulfuric acid, i.e. concentrated or dilute sulfuric acid, is reacted with the starting amine to give insoluble precipitate and phorphoric acid is slightly dissolved in the reaction system only in case of using a 50% solution. In these cases, the desired bis-cyanoethylated compound is little obtained. Specific examples of the catalyst include hydrochloric acid, nitric acid, lower fatty acids (e.g. acetic acid, monochloroacetic acid, trichloroacetic acid), phenols (e.g. phenol, p-chlorophenol, p-nitrophenol, 2,4,6-trinitrophenol), sulfonic acids (e.g. p-toluenesulfonic acid), metal halides (e.g. cuprous chloride, ferric chloride, zinc chloride, cobalt chloride, manganese chloride, stannic chloride, aluminum chloride, boron trifluoride), ammonium halides (e.g. ammonium chloride), acid addition salts of aliphatic amines (e.g. isopropylamine hydrochloride, cyclohexylamine hydrochloride, trimethylamine hydrochloride, triethylamine hydrochloride, N - (2-cyanoethyl)-isopropylamine hydrochloride, N-(2-cyanoethyl)-isopropylamine nitrate, N-(2 - cyanoethyl)-cyclohexylamine hydrochloride, N - (2 - cyanoethyl)-cyclohexylamine nitrate), etc.

The amount of the acidic catalyst depends on the kind of the used catalyst and ordinarily may be from the range of about 1 to about 100 mol percent or more to the starting amine. For example, a strong acid such as hydrochloric acid or nitric acid is effective in a small amount, but on the other hand in a larger amount the yield of the desired product is reduced. Thus, a strong acid may be usually used in an amount up to about 20 mol percent. On the contrary, a week acid such as acetic acid or phenol is effective for the bis-cyanoethylation even in an amount more than 100 mol percent.

The temperature may be varied widely but it is normally preferred to carry out the reaction while refluxing.

The use of a solvent is usually not needed. But a small amount of water may be effectively added since it can increase the solubility of the catalyst. In case of using an organic solvent, there should be selected a solvent, by which the catalyst is not made insoluble in the reaction system.

The desired bis-cyanoethylated compound is obtained in a high yield by using only 1.5 to 5 times the theoretical amount of acrylonitrile. Even in the case that a large excess amount of acrylonitrile is employed, polymerization of acrylonitrile rarely occurs contrary to the case of using a basic catalyst, and unreacted acrylonitrile can be almost quantitatively recovered after the reaction.

The N,N-bis-cyanoethylated compound thus produced can be reduced by a conventional method, e.g. catalytic reduction using nickel, cobalt or platinum, reduction with metallic sodium and an alcohol, reduction with lithium aluminum hydride, etc., to give the corresponding diamine compound which is used for various purposes such as the starting material for the preparation of an easily dyeable polyamide fiber.

The following examples illustrate practical and presently-preferred embodiments of the present invention.

EXAMPLE 1

A flask equipped with a reflux condenser is charged with 2 - aminopropane (59 g.) and acrylonitrile (159 g.), and 50% nitric acid (12 g.) is added thereto. The flask is placed in an oil bath of 100 to 120° C., and the reaction is carried out under reflux for 16 hours. After recovery of excess of acrylonitrile (about 50 g.), 10% aqueous sodium hydroxide (100 ml.) is added to the resultant mixture. After being shaken well, the mixture is divided into the oily layer and the aqueous layer. The aqueous layer is extracted with ether (100 ml.). The extract is combined with the oily layer, dried over anhydrous sodium sulfate and distilled to give 10 g. of the pre-fraction (boiling point: 105° C./20 mm. Hg) and 140 g. of the main fraction (boiling point: 121° C./0.5 mm. Hg; $n_D^{26}$=1.4563). The pre-fraction is N-(2-cyanoethyl) - 2 - aminopropane. The main fraction is confirmed as N,N-bis(2 - cyanoethyl) - 2 - aminopropane by means of elementary analysis, molecular weight determination and analyses of IR spectrum and NMR spectrum.

The above prepared bis-cyanoethylated compound can be converted into the corresponding bis-aminopropyl compound as follows:

A one liter autoclave is charged with N,N-bis(2-cyanoethyl) - 2 - aminopropane (82.5 g.), Raney nickel (20 g.) and ammonia-saturated methanol (300 ml.). After replacing air in the autoclave with hydrogen gas, the pressure of hydrogen gas is maintained at 140 atm. The mixture is heated while agitating and reacted at 80° C. for 1 hour. The reaction mixture is filtered to eliminate the catalyst, distilled to remove the lower boiling point materials such as methanol and then distilled under reduced pressure. After the pre-fraction is distilled off, 62 g. of the main fraction (boiling point: 85 to 86° C./0.9 mm. Hg; $n_D^{26.5}$=1.4677) are obtained. The latter is confirmed as N,N - bis(3 - aminopropyl) - 2 - aminopropane by means of elementary analysis, quantitative analysis of amino group and IR absorption spectrum.

EXAMPLE 2

A flask equipped with a reflux condenser is charged with 2-aminopropane (1 mol) and acrylonitrile (3 mol), and an acidic catalyst (0.1 mol) is added thereto under cooling. The mixture is heated under reflux for 16 hours. The lower boiling point materials such as unreacted 2-aminopropane and acrylonitrile are removed off. The reaction mixture is washed well with an aqueous sodium hydroxide and extracted with ether. (In case of using a metal salt catalyst, it is immediately extracted with ether without washing with an aqueous sodium hydroxide.) The yield of N,N - bis(2 - cyanoethyl) - 2 - aminopropane in the ether layer is determined by means of gas chromatography. The results are shown in the following table:

| Catalyst: | Yield (percent) |
|---|---|
| 35% HCl | 90.0 |
| 50% $HNO_3$ | 90.0 |
| $CH_3COOH$ | 89.7 |
| Phenol | 51.0 |
| p-Nitrophenol | 63.2 |
| p-Toluenesulfonic acid | 90.0 |
| $FeCl_3 \cdot 6H_2O$ | 80.6 |
| $CoCl_2$ | 86.3 |
| $ZnCl_2$ | 81.3 |
| $(C_2H_5)_3N \cdot HCl$ | 73.0 |
| $(CH_3)_2CHNH_2 \cdot HCl$ | 95.0 |
| $(CH_3)_2CHNHCH_2CH_2CN \cdot HCl$ | 99.6 |
| $(CH_3)_2CHNHCH_2CHCN \cdot HNO_3$ | 98.3 |

EXAMPLE 3

To a mixture of N - (2 - cyanoethyl) - 2 - aminopropane (1 mol) and acrylonitrile (2 mol), 60% $HNO_3$ (0.1 mol) is added, and the resultant mixture is heated under reflux for 16 hours. N,N - bis(2 - cyanoethyl)-2-aminopropane in the reaction mixture is determined by means of gas chromatography. The yield is 90%.

EXAMPLE 4

The reaction is carried out as in Example 1 but using 2 - aminobutane (73 g.) in place of 2 - aminopropane (59 g.) to give 89 g. of the main fraction (boiling point: 116 to 117° C./0.25 mm. Hg; $n_D^{21.5}$=1.4598). The product is confirmed as N,N - bis(2 - cyanoethyl) - 2 - aminobutane by means of elementary analysis, molecular weight determination and analyses of IR absorption spectrum and NMR spectrum.

The above prepared bis-cyanoethylated compound can be converted into the corresponding bis-aminopropyl compound as follows:

N,N-bis(2-cyanoethyl)-2-aminobutane (89.5 g.) is reduced with Raney nickel. The resulting product is distilled to give the pre-fraction and then 66 g. of the main fraction (boiling point: 90 to 91° C./0.65 mm. Hg; $n_D^{26.5}$=1.4683). It is confirmed as N,N - bis(3 - aminopropyl)-2-aminobutane by means of elementary analysis, analysis of amino group and IR spectrum.

EXAMPLE 5

2-aminobutane acetate (1 mol) and acryonitrile (3 mol) are reacted under reflux for 16 hours. N,N-bis(2-cyanoethyl)-2-aminobutane in the reaction mixture is determined by means of gas chromatography. The yield is 83.5%

EXAMPLE 6

A flask equipped with a reflux condenser is charged with cyclohexylamine (99 g.) and acrylonitrile (159 g.), and 50% nitric acid (12 g.) is added thereto. The flask is placed in an oil bath of 100 to 120° C., and the reaction is carried out under reflux for 16 hours. After recovery of excess of acrylonitrile, 10% aqueous sodium hydroxide (100 ml.) is added to the resultant mixture. After being shaken well, the mixture is divided into the oily layer and the aqueous layer. The aqueous layer is extracted with ether (100 ml.). The extract is combined with the oily layer, dried over anhydrous sodium sulfate and distilled to give 16 g. of the pre-fraction (boiling point: 78° C./0.15 mm. Hg) and 155.2 g. of the main fraction (boiling point: 140° C./0.15 mm. Hg). The pre-fraction is N - (2 - cyanoethyl) - cyclohexylamine. The main fraction is confirmed as N,N-bis(2-cyanoethyl)-cyclohexylamine by means of elementary analysis, molecular weight determination and analyses of IR spectrum and NMR spectrum.

The above prepared bis-cyanoethylated compound can be converted into the corresponding bis-aminopropyl compound as follows:

A 500 ml. autoclave is charged with N,N-bis(2-cyanoethyl-cyclohexylamine (50 g.), Raney nickel (10 g.) and ammonia-saturated methanol (150 ml.). After replacing air in the autoclave with hydrogen gas, the pressure of hydrogen gas is maintained at 140 atm. The mixture is heated while agitating and reacted at 80° C. for 1 hour. The reaction mixture is filtered to eliminate the catalyst, distilled to remove the lower boiling point materials such as methanol and then distilled under reduced pressure. After 10.9 g. of the pre-fraction (boiling point: 70° C./0.60 mm. Hg) are distilled off, 35.2 g. of the main fraction (boiling point: 114° C./0.60 mm. Hg) are obtained. The latter is confirmed as N,N-bis(3-aminopropyl)-cyclohexylamine by means of elementary analysis, quantitative analysis of amino group and IR absorption spectrum.

EXAMPLE 7

A flask equipped with a reflux condenser is charged with cyclohexylamine (1 mol) and acrylonitrile (3 mol), and an acidic catalyst (0.1 mol) is added thereto under cooling. The mixture is heated under reflux for 16 hours. The lower boiling point materials such as unreacted cyclohexylamine and acrylonitrile are removed off. The reaction mixture is washed well with an aqueous sodium hydroxide and extracted with ether. (In case of using a metal salt catalyst, it is immediately extracted with ether without washing with an aqueous sodium hydroxide.) The yield of N,N-bis(2-cyanoethyl)-cyclohexylamine in the ether layer is determined by means of gas chromatography. The results are shown in the following table:

| Catalyst | Yield, percent |
|---|---|
| 35% HCl | 90.0 |
| 50% HNO₃ | 90.3 |
| ClCH₂COOH | 64.4 |
| Cl₃CCOOH | 64.5 |
| Phenol | 68.4 |
| p-Nitrophenol | 79.2 |
| 2,4,6-trinitrophenol | 76.6 |
| p-Toluenesulfonic acid | 75.2 |
| CuCl | 49.7 |
| BF₃·(C₂H₅)₂O | 49.7 |
| FeCl₃·6H₂O | 49.2 |
| ZnCl₂ | 56.5 |
| CoCl₂ | 66.4 |
| MnCl₂ | 69.3 |
| SnCl₂·2H₂O | 60.5 |
| NH₄Cl | 56.1 |
| ⟨H⟩—NH₂·HCl | 96.4 |
| ⟨H⟩—NHCH₂CH₂CN·HCl | 59.5 |
| ⟨H⟩—NHCH₂CH₂CN·HNO₃ | ca. 100 |
| (C₂H₅)₃N·HCl | 72.6 |

EXAMPLE 8

A mixture of cyclohexylamine acetate (1 mol) and acrylonitrile (3 mol) is heated under reflux for 16 hours. After removal of the lower boiling point materials, the resultant mixture is washed with an aqueous sodium hydroxide and then extracted with ether. N,N-bis(2-cyanoethyl)-cyclohexylamine in the ether extract is determined by means of gas chromatography. The yield is 72.8%.

EXAMPLE 9

A mixture of cyclohexylamine (9.9 g.), acrylonitrile (15.9 g.) and phenol (20.0 g.) is heated under reflux for 16 hours. N,N - bis(2 - cyanoethyl) - cyclohexylamine contained in the reaction mixture is determined by means of gas chromatography. The yield is 95%.

What is claimed is:

1. Process for the preparation of an N,N-bis-(cyanoethyl)amine of the formula:

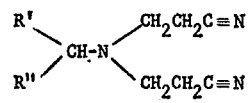

wherein R′ and R″ when taken independently are each alkyl of 1 to 5 carbon atoms or when taken together are tetramethylene or pentamethylene, which comprises heating an α-branched amine of the formulas:

with from 1.5 to 5 times the stoichiometric amount of acrylonitrile in the presence of a catalytic amount of a catalyst selected from the group consisting of hydrochloric acid, nitric acid, acetic acid, monochloroacetic acid, trichloroacetic acid, phenol, p-chlorophenol, p-nitrophenol, 2,4,6-trinitrophenol, p-toluenesulfonic acid, cuprous chloride, ferric chloride, zinc chloride, cobalt chloride, manganese chloride, stannic chloride, aluminum chloride, boron trifluoride, ammonium chloride and salts of amines with hydrochloric acid, nitric acid, acetic acid or p-toluenesulfonic acid until formation of said N-N-bis-(cyanoethyl)amine is substantially complete.

2. The process according to claim 1 wherein the catalyst is hydrochloric acid, nitric acid, acetic acid, p-toluenesulfonic acid or a salt thereof with said α-branched amine.

3. The process according to claim 2, wherein the catalyst is hydrochloric acid.

4. The process according to claim 2, wherein the catalyst is nitric acid.

5. The process according to claim 2, wherein the catalyst is the salt of said α-branched amine with hydrochloric acid.

6. The process according to claim 2, wherein the catalyst is the salt of said α-branched amine with nitric acid.

References Cited

UNITED STATES PATENTS

| 1,992,615 | 2/1935 | Hoffmann et al. | 260—465.5 R |
| 3,020,310 | 2/1962 | Fowler et al. | 260—465.5 R |
| 3,028,415 | 4/1962 | Nordgren | 260—465.5 R |

OTHER REFERENCES

Organic Reactions, vol. 5, (1949), John Wiley & Son, pp. 82, 83, 84, 85, 86, 114, 115, 116, 117, 118, 119.

Luskin et al.: J.A.C.S. (1956), pp. 4042 to 4044.

I. G. Farben: C. A., (1934), vol. 28, page 4068.

JOSEPH P. BRUST, Primary Examiner

U.S. Cl. X.R.

260—465.5